INVENTOR.
ANDREW J. TACCHELLA
BY
Meelin and Hanscom
ATTORNEYS

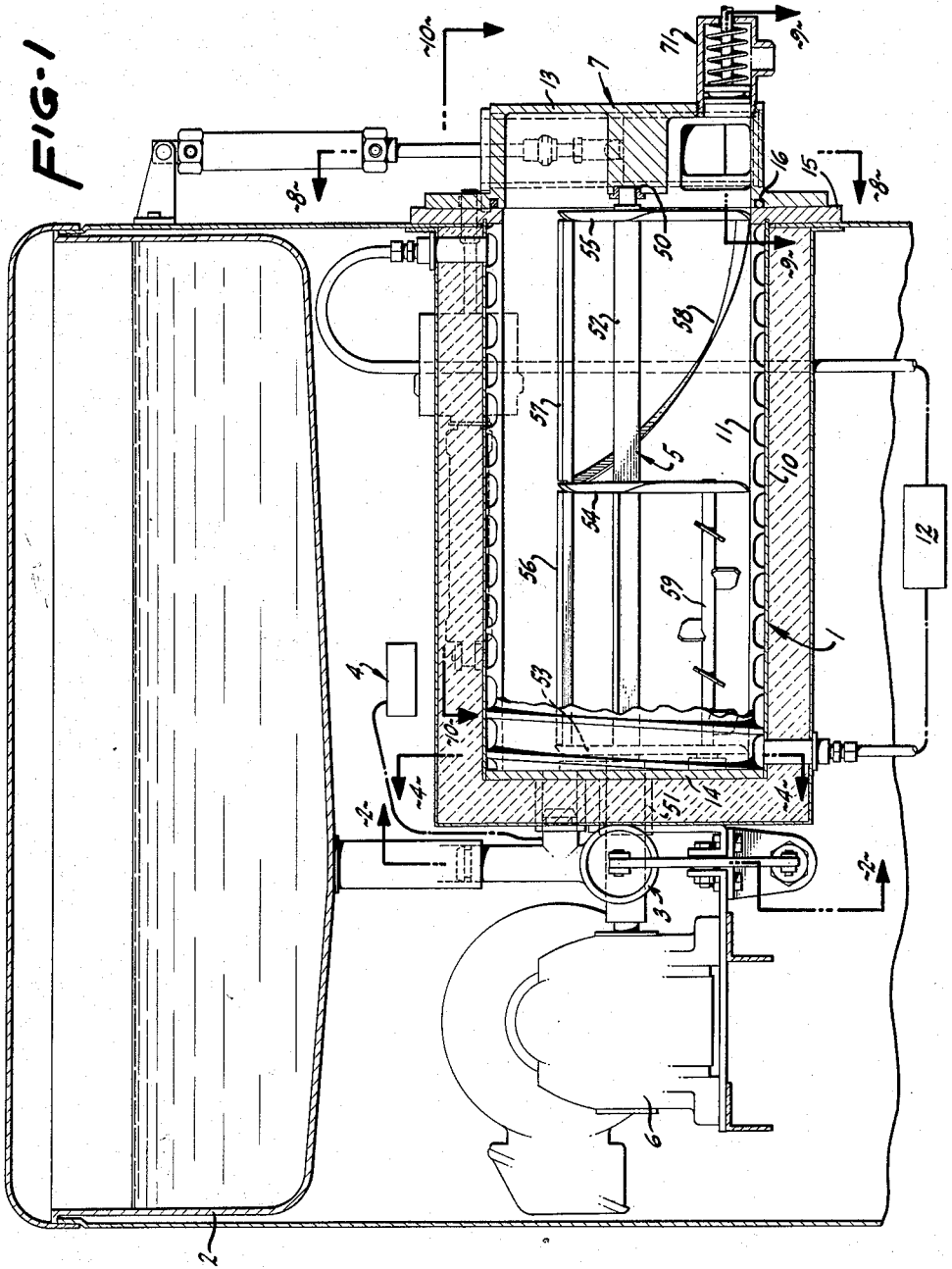

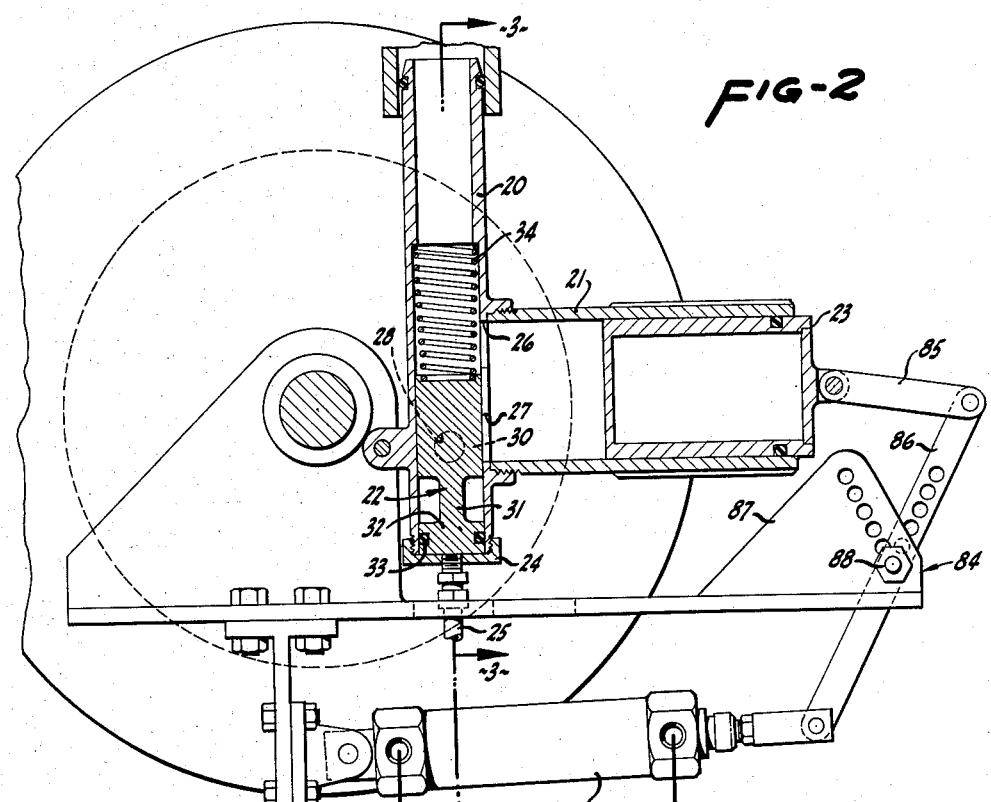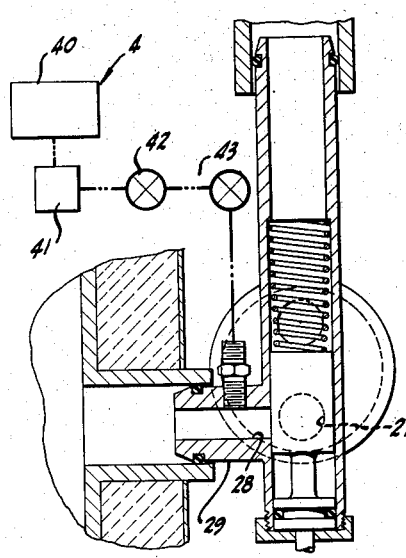

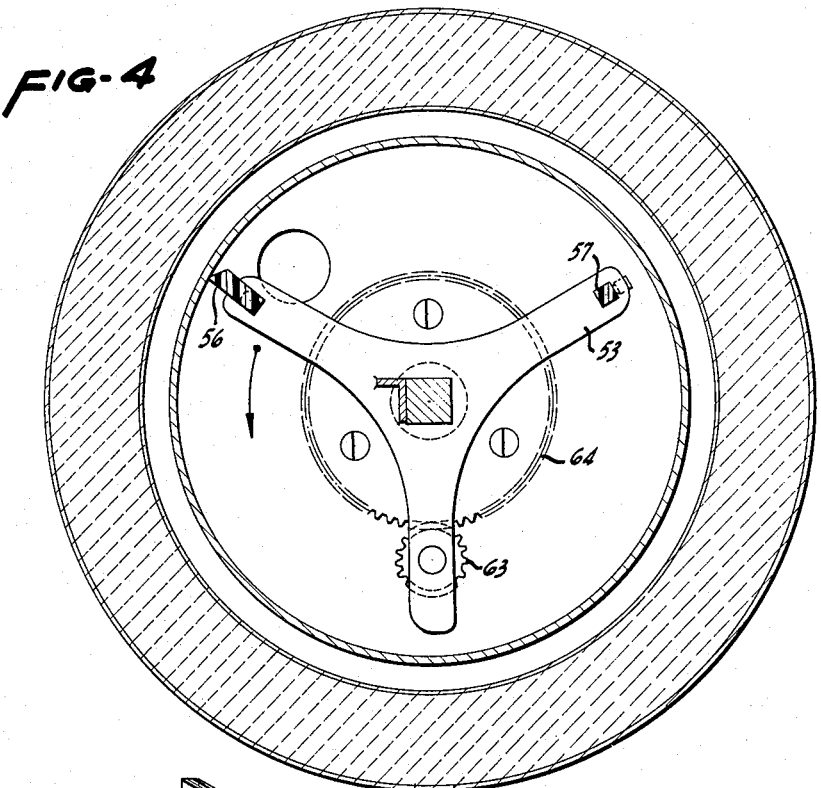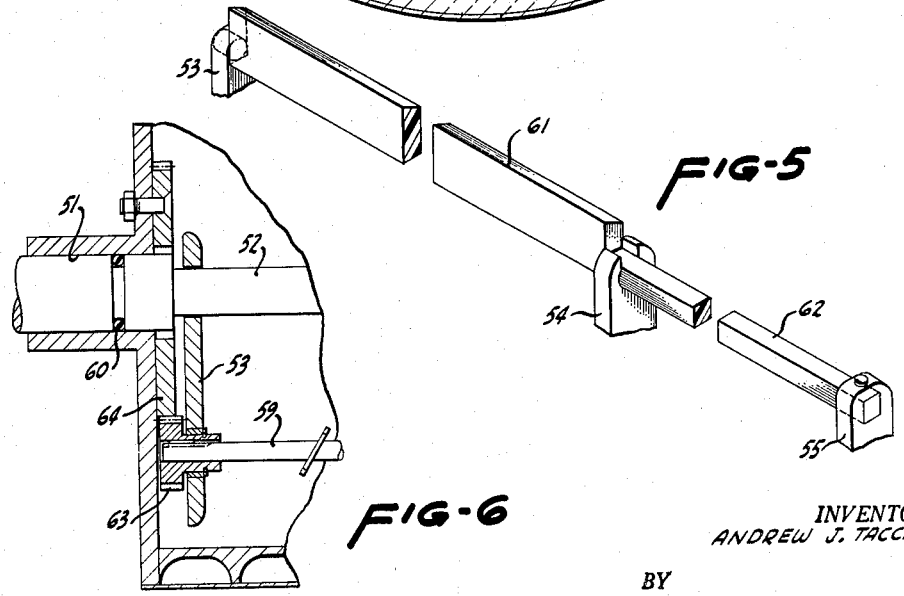

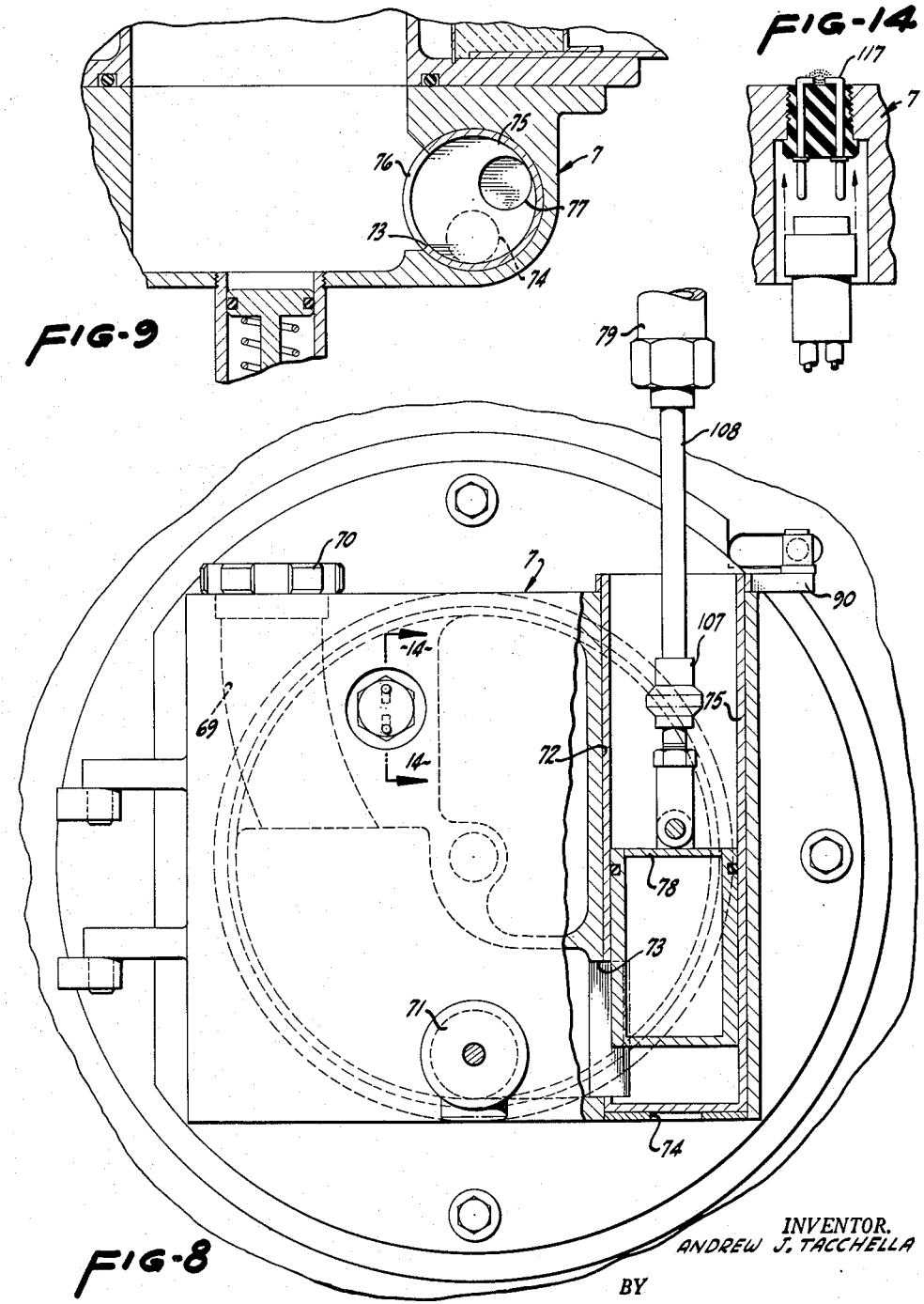

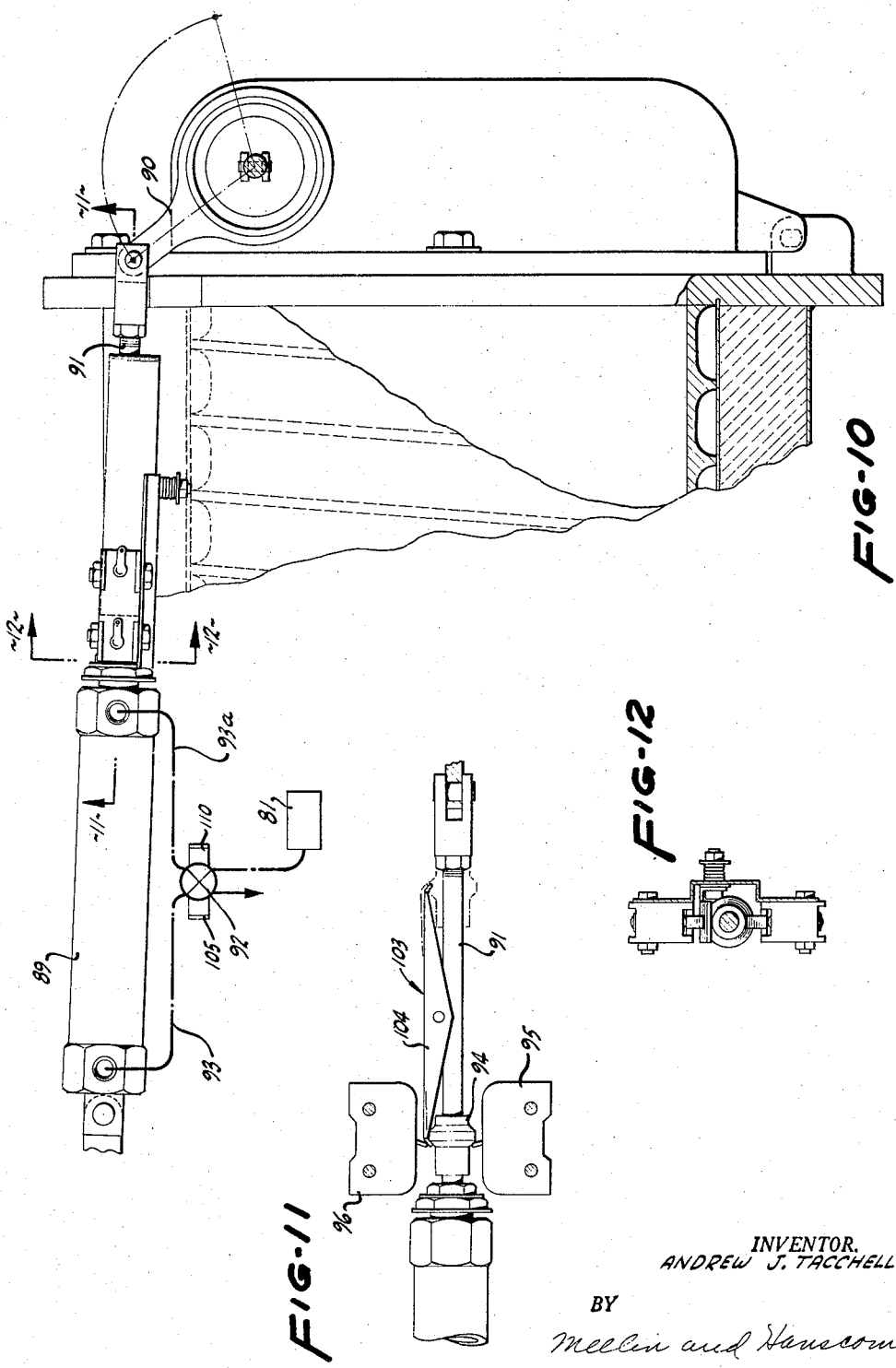

United States Patent Office 3,147,601
Patented Sept. 8, 1964

3,147,601
METHOD AND APPARATUS FOR PROCESSING AND DISPENSING ICE CREAM PRODUCTS
Andrew J. Tacchella, Portland, Oreg., assignor to Magic Flow Freezer Co., Portland, Oreg., a corporation of Oregon
Continuation of application Ser. No. 801,024, Mar. 23, 1959. This application Mar. 9, 1962, Ser. No. 179,527
20 Claims. (Cl. 62—136)

This invention relates to ice cream processing and dispensing apparatus and more particularly involves methods and apparatus for continuously producing and dispensing an ice cream product.

This application is a continuation of application Ser. No. 801,024, filed March 23, 1959, now abandoned.

It is one object of this invention to generally improve upon prior art methods for producing similar products by agitating a prepared mix under pressure, thereby hastening the preparation of an aerated frozen mixture.

A second object of this invention is to provide ice cream processing and dispensing apparatus having a mix container from which proportional amounts of prepared and frozen mix are respectively inserted and dispensed in simultaneous operation.

Another object of this invention is to proxide in an ice cream processing and dispensing machine means for adjusting the proportional amounts of prepared mix added relative to the amount of frozen mix dispensed.

A further object is to provide an ice cream processing and dispensing machine having a push button control means for operating the machine through one complete cycle of operation, whereby prepared mix is simultaneously inserted into a processing container while a proportional amount of frozen mix is dispensed therefrom.

Another object of this invention is to provide in an ice cream processing and dispensing apparatus an improved agitating means including a dasher device rotatably mounted on two parallel axes, a pair of torsionally mounted scraper blades and a helical pusher blade.

A further object is to provide in an ice cream processing and dispensing apparatus an improved scraper arrangement including torsionally mounted scraper blades which insure a more uniform scraper contact while reducing the need for frequent blade adjustments.

It is another object of this invention to provide in an ice cream processing and dispensing apparatus an improved freezing and processing container to obtain a maximum cooling effect and efficiency.

Still another object is to provide in an ice cream processing and dispensing apparatus a control means including a pair of spaced electrodes and a bridge circuit for detecting the aerated consistency of the frozen mix and initiating additional agitation of the mix whenever said consistency is subnormal.

Other objects of this invention will become apparent from a study of the following description and in view of the accompanying drawings.

In the drawings, forming a part of this application and in which like parts are designated by like reference numerals throughout the same, FIG. 1 is an elevational view of an ice cream processing and dispensing machine, shown partly in section;

FIG. 2 is a view, partly in section, taken on lines 2—2 of FIG. 1 and showing details of the means for inserting a measured quantity of prepared mix into a processing chamber. Schematic representations are added to indicate certain operating means;

FIG. 3 is a section taken on lines 3—3 of FIG. 2 including schematic additions to indicate a means for injecting air into the processing chamber;

FIG. 4 is a transverse section of the processing chamber and dasher assembly taken on lines 4—4 of FIG. 1;

FIG. 5 illustrates a perspective view of a torsionally mounted scraper which forms part of the dasher assembly;

FIG. 6 is an enlarged fragmentary section of the drive connection for the dasher assembly shown in FIG. 1;

FIG. 8 is an end elevational view of the machine shown partly in section, taken on lines 8—8 of FIG. 1;

FIG. 9 is a section taken on lines 9—9 of FIG. 1;

FIG. 10 is a plan view of the operating mechanism for a two-way dispensing valve, taken on lines 10—10 of FIG. 1, and showing part of the processing chamber in section;

FIG. 11 is an elevational view in the direction of arrows 11—11 on FIG. 10, showing the tripping control assembly, including a trip collar and tilt cam;

FIG. 12 is a transverse section taken on lines 12—12 of FIG. 10 and showing the mounting assembly for the tilt cam;

FIG. 14 is a section of the electrode sensing device taken on lines 14—14 of FIG. 8;

Figure 7:
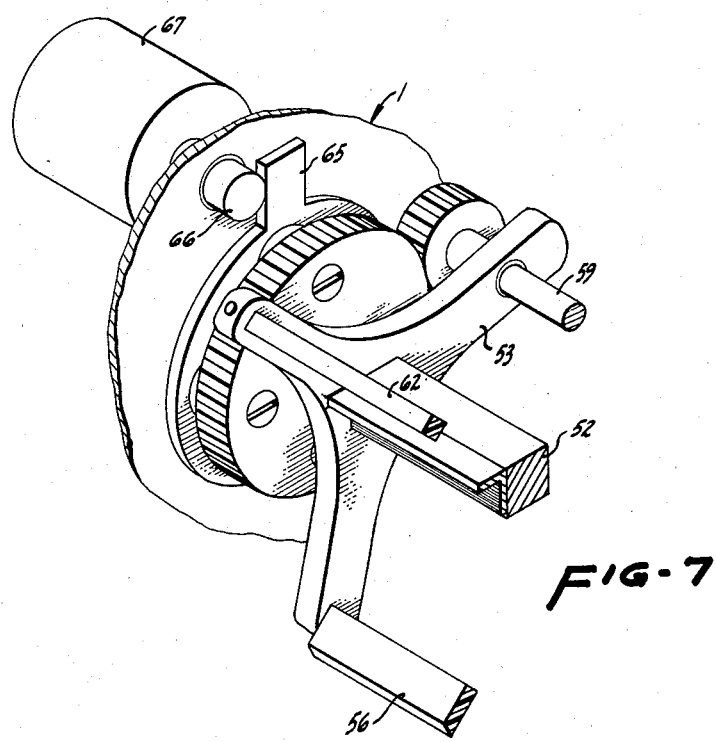
FIG. 7 illustrates a perspective view of a modified form of drive structure including means for dogging an otherwise rotatably mounted bull gear.

Referring more particularly to FIG. 1 of the drawings, there is shown one embodiment of this invention in ice cream processing and dispensing apparatus. The apparatus shown, in terms of broad inclusion, comprises a pressurized processing and freezing container 1, a supply tank 2 for retaining a source of prepared mix, means 3 for inserting a measured quantity of prepared mix into container 1, means 4 for injecting air under a constant pressure into the container, means 5 including a motor 6 for agitating the inserted prepared mix with air to create an aerated frozen product, and means 7 for dispensing a measured quantity of the frozen product from the container. Additionally, a control circuit (FIG. 13) and related apparatus are provided to initiate and effectuate a cycle of operation whereby proportional amounts of prepared and aerated mix are respectively introduced and dispensed from the processing container. The control circuit includes a means for initiating or stepping up the agitation process as new amounts of prepared mix are added to the processing container. Other controlled means are provided for operating the agitating means according to the aerated consistency of the mix, which is termed over-run.

The processing container is formed with a refrigerating chamber defined between an outer cylindrical shell 10 and an internal shell 11 which is helically grooved on its outer surface, the raised helix engaging the inner surface of shell 10 to define a helical flow path for a refrigerant. Openings are provided in shell 10 at both ends of the helical flow path and connect with a refrigerating system including a compressor unit 12. In operation, a refrigerant is circulated through the helical groove, and since it is in direct contact with internal shell 11, a maximum cooling effect and efficiency is obtained.

Shell 11 is internally formed as a circular cylinder which is closed off at both ends by a header plate 13 and a closure plate 14. The header plate is bolted to a flange portion 15 provided at the end of shells 10 and 11, and a sealing ring 16 is disposed between the flange and header to fluidly seal the assembly and prevent leakage. Closure plate 14 may be welded to the ends of the shells, thereby permanently closing that end of the processing container except for a journal opening and an opening for inserting the prepared mix into the processing chamber.

FIGS. 2 and 3 illustrate in detail the means for inserting a measured quantity of prepared mix into container 1, and comprises in general an injector cylinder 20 to which a measuring cylinder 21 is removably connected and in which a valve member 22 is reciprocally movable. A plunger means 23 is reciprocally mounted in the measuring chamber for taking in and expelling a quantity of prepared mix in a manner to be described.

The injector cylinder fluidly connects with the source of prepared mix at one end and is closed off at the other end by a cap plate 24 through which a source of pneumatic operating pressure may be applied via pressure line 25. A first opening 26 and a second axially aligned opening 27 are provided in cylinder 20, both opening into the measuring cylinder 21; and a third opening 28 is provided in the cylinder along the same axial length as opening 27. Opening 28 connects with a conduit 29 which opens into the processing container through the bearing plate described.

The valve element 22 is formed with a closure piston 30, a reduced diameter central portion 31, and an operating piston 32 having an O-ring seal 33. A coiled spring 34 is lodged in cylinder 20 between the valve element and an internal shoulder, thereby urging the element against the cap plate 24 as shown. The operation of this valve assembly will be apparent in view of FIG. 2: When the valve element is biased against the cap plate, the closure piston 30 closes off opening 27 but permits a quantity of mix to be drawn into cylinder 21 from the source of prepared mix. If an operating pressure is then applied into pressure line 25, the valve element will be moved against its spring bias into a position closing off opening 26 but now permitting the mix in chamber 21 to be expelled through opening 27, around central portion 31, out opening 28, into conduit 29 and, hence, into the processing container.

It has been found that by agitating a prepared mix under a pressure of five to ten pounds per square inch, the required processing time is appreciably reduced. While, higher pressures may be utilized, they tend to produce leakage around the dispenser opening and, therefore, the most practical operating pressures have been found to be in the suggested pressure range. Accordingly, means is provided for injecting and maintaining a constant air pressure within the processing container, and comprises a source of pressurized air 40 which connects with the container through an air filter 41, a pressure differential valve 42 and a bleed-off valve 43. The pressure source may be derived from a conventional compressor unit which feeds a supply tank and includes a control circuit which will maintain a pressure in the tank in excess of any selected container pressure. Bleed-off valve 43 permits the air pressure in the processing container to be reduced to the selected pressure if it should become overpressurized.

An agitating means or dasher assembly is rotatably mounted within processing container 1 upon bearings 50 and 51, which are respectively provided on header plate 13 and closure plate 14. The assembly in general comprises a journaled drive shaft 52, operatively connected to motor 6; three triradiant support yokes 53, 54 and 55, each keyed to shaft 52; two scrapers 56 and 57; a helical pusher blade 58; and a dasher device 59. Since the container is subjected to internal air pressure, the driven end of shaft 52 is provided with a groove and sealing ring 60, which cooperates with bearing surface 51 to fluidly pressure seal the container.

Yokes 53 and 55 are mounted adjacent opposite ends of the container, and yoke 54 is located near the center. Each yoke has three radiating spider members angularly spaced and substantially parallel to a corresponding spider member of the other yokes.

Scraper members 56 and 57 are mounted between ends of parallel sets of spider members, each scraper being formed with a blade member 61, journaled in an opening provided in the spider member of an end yoke, and a torsion arm 62 of approximately equal length secured rigidly to a spider member of the yoke at the opposite end. The scrapers are preferably made of nylon material which is extremely durable, being of high tensile strength and having the proper amount of resiliency. Each scraper is also rotatably supported in a notched end of the center yoke, substantially as shown in FIG. 5.

The blade members of the scrapers are mounted at opposite ends of the container; and since they are positioned in abutting contact with the inner cylindrical surface of the container, each blade complements the other and together will provide means for scraping the entire inner axial surface of the container. As the shaft, yokes and scrapers are rotated in the container, the blade members will bear against the inner container surface, and, depending on the frictional contact forces resisting turning, the blades will be rotated in their journal mountings, thereby relieving the frictional engagement while being resiliently held by the fixed torsion arm. Accordingly, this scraper mounting insures an almost constant and uniform scraper contact which materially improves the operation while reducing the need for frequent blade adjustments.

Helical pusher blade 58 extends axially and convolutely from a spider member on the center yoke 54 toward the dispensing end of container 1 where it connects to a spider member of yoke 55. Obviously as the dasher assembly is rotated, the blade will be turned through the mix, and by screw action urge the mix toward the container dispenser opening.

Dasher device 59 is rotatably mounted on a second axis parallel to the axis of shaft 52 and extending between parallel spider members of yokes 53 and 54, as shown in FIGS. 1 and 6. A pinion 63 rotatably mounted on the second axis with the dasher device engages a bull gear 64, which in turn is mounted on the axis of shaft 52. The bull gear may be rigidly connected to the end of container 1 by bolts or screws, shown in FIG. 4, in which case it acts as a fixed sun gear about which pinion 63 rotates. The angular speed of pinion 63 and dasher device 59 is then directly proportional to the angular turning of shaft 52.

However, in an alternate arrangement, FIG. 7, the bull gear is rotatably mounted on shaft 52 and is provided with a lobed plate 65 which may be selectively dogged by a plunger 66 operated electrically by a solenoid 67. With the latter device, the speed of pinion rotation about its second axis will depend largely upon whether the bull gear is dogged or whether it is free to turn on the shaft. If the bull gear is dogged, as shown, the angular speed of the pinion will be in direct proportion to the angular speed of shaft 52, as was the aforementioned assembly. However, if gear 64 is free to turn with the shaft, and if there is no slippage therebetween, then there will be no angular movement of the dasher device about the second axis. By adjusting the slippage between shaft 52 and gear 64 at the time of installation, the dasher device may be selectively controlled to turn about its second axis at a high and a low angular speed, depending on whether or not the bull gear has been dogged. And, thus, means is provided in such a device for selectively accelerating the rate at which the mix would be agitated by the dasher device.

Header plate 13 is provided with a filling funnel 69, FIG. 8, which is initially used to fill container 1 to its operating capacity. Once filled, the funnel is sealed off with a cap 70 which may be locked in place. The header plate is also formed with a vertical cylindrical bore 72 having a lateral opening 73, communicating with container 1, and a vertical discharge port 74 located between the axis of bore 72 and its peripheral circumference, shown in FIGS. 8 and 9. A drain spigot 71 is threadedly connected to the header plate and opens into container 1, thereby providing means for manually draining the container during periods of cleaning. The spigot is normally closed by a plunger device which is sealed in place.

Means for dispensing a measured quantity of frozen mix is disposed in the header bore 72 including a rotary valve cylinder 75 having a lateral opening 76 and a bottom port hole 77. Opening 76 and port hole 77 are arranged to cooperate, respectively, with opening 73 and port 74 in such manner that when the openings are aligned, the ports are misaligned. By rotating the valve cylinder, the inner chamber thereof can be selectively positioned to communicate with either the container or the atmosphere.

A plunger means 78 is reciprocally mounted in the valve cylinder to take in a measured quantity of aerated frozen mix from the container and expel it out the discharge port 74. The plunger means 78 and previously mentioned plunger means 23 are similarly formed with a piston and sealing ring, and both pistons are operated by double acting work cylinders 79 and 80, as shown in FIG. 2.

Cylinders 79 and 80 are fluidly interconnected at one end, and the other end of each is connected to a source of pneumatic pressure 81 that is selectively applied by operation of a pair of solenoid operated valves 82 and 83 which are spring-biased closed. (Such a connection is schematically shown in FIG. 2.) Since the work cylinders are operated together, depending upon which solenoid operated valve is opened, the plunger means 23 and 78 will be moved simultaneously, thereby inserting a measured quantity of prepared mix while dispensing a measured quantity of aerated frozen mix.

It will be further noted that the admission of pneumatic pressure into pressure line 25 is also controlled by valve 82. Therefore, at any time this valve is open it will operate the valve member 22 into a position closing off the opening 26 as previously described.

While the piston movements of the plunger means are proportional, they need not be equal, and, in fact, are not so designed. Since the quantity of aerated frozen mix which is dispensed will be equal to combined volumes of prepared inserted mix and air, the pistons are designed to operate with movements proportional to a selected aerated consistency or over-run. A further enhancement of this device is the provision of a means for adjusting the relative amount of piston travel, thereby enabling various volume proportions of mix to be simultaneously inserted into and dispensed from the container.

Plunger means 23 is connected to work cylinder 80 through an adjustable pivot mount 84 including a pitman 85, crank 86 and a mount plate 87. Plate 87 and crank 86 are each provided with a series of openings through which a pivot rod 88 may be selectively engaged. The work cylinder 80 is itself pivotally mounted and may adjust to whatever pivot connection has been selected. By inserting the pivot rod in a particular set of complementary openings, the amount of piston travel of the plunger means is controlled and the ratio of inserted mix to aerated mix may be selected.

Valve cylinder 75 is operated by a third double acting cylinder 89, as best shown in FIGS. 8 and 10. A crank arm 90 is provided at the upper end of the valve element and is pivotally connected to the operating piston rod 91 of cylinder 89 which is pivotally mounted to a support. Cylinder 89 is pneumatically operated and controlled by two solenoids which operate a two-way valve 92, thereby connecting one of the operating ends to the pressure source 81 over conduits 93 and 93a. Once operated, valve 92 remains in that position until reversely operated by the other solenoid.

A control circuit, including a plurality of mechanically operated switches, is provided to initiate and effectuate one complete cycle of operation of the described apparatus. Referring more particularly to FIGS. 10–13, the piston rod 91 carries a first camming collar 94 for operating a first SPDT biased switch 95 and a second SPDT biased switch 96. Switch 95 is directly operated by the collar 94 and in the position shown in FIGS. 11 and 13 actuates a solenoid 97 for operating valve 83 to open. As the collar 94 moves away from the switch lever, the biasing means actuates the switch to operate a relay 98 which in turn closes a pair of switches 99 and 100, thereby preparing a circuit for operating solenoid 101 and energizing relay 102 for purposes hereinafter described.

Switch 96 is operated by collar 94 through a tilt cam assembly 103 which is mounted adjacent the piston rod. Assembly 103 comprises a pivotally mounted tilt plate 104 which is directly operated at both ends by collar 94. The tilt plate in turn operates switch 96 to one or the other of its two connecting positions, depending upon the most recent movement of the camming collar, and it will hold the switch against its bias until the collar reaches the opposite end of its travel. In the position illustrated, FIG. 13, the switch is prepared to actuate solenoid 105 for operating valve 92 as soon as the push button 106 is manually operated. In its alternate position, switch 96 completes a circuit providing a source of current for operating solenoid 101.

A second camming collar 107 is mounted upon the piston rod 108 of work cylinder 79. The collar operates a biased open switch 109; and as the piston completes its upward thrust, retracting plunger means 78, the switch is closed and will actuate a solenoid 110 for operating the valve 92 into its other position.

Figure 13:
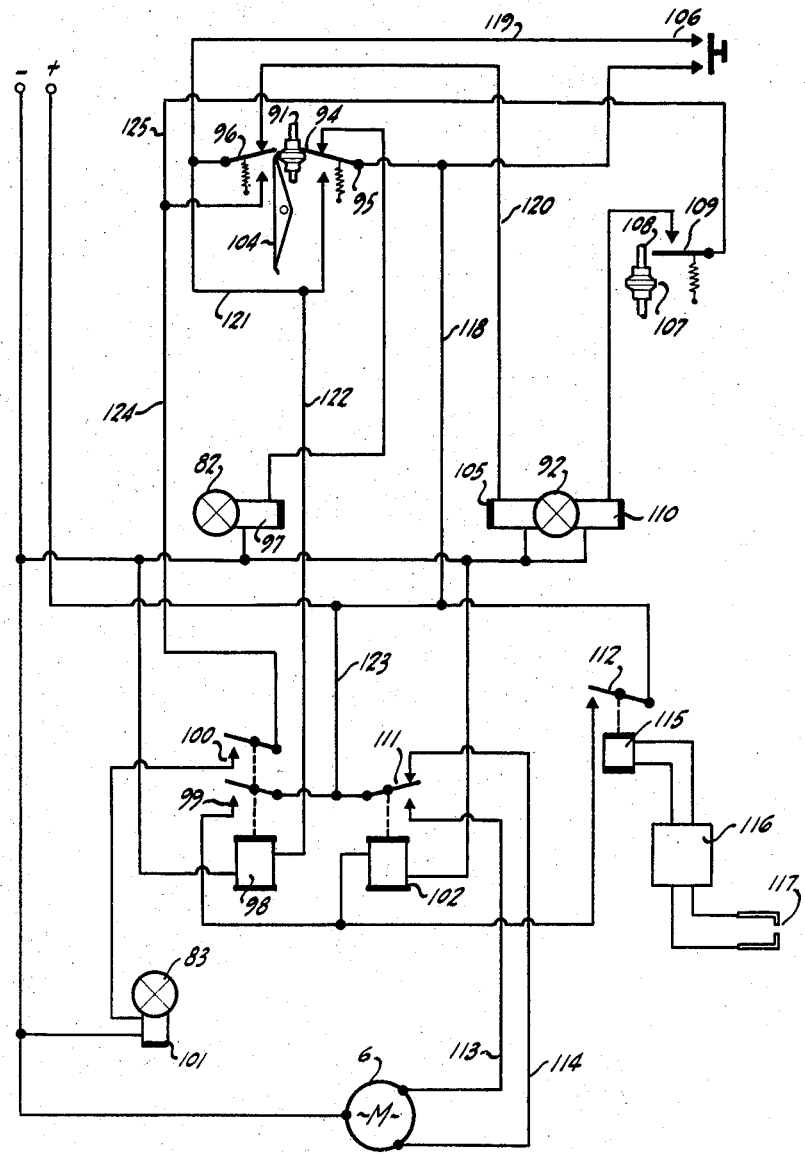
FIG. 13 is a schematic wiring diagram of a complete control circuit for operating the apparatus described.

Referring to FIG. 13, it will be noted that relay 102 operates a SPDT switch between one of two motor connecting lines. When relay 102 is energized by the closure of switches 99 or 112, the motor connection is switched to a high speed winding through line 113. Accordingly, if neither switch 99 or 112 is closed, then the motor operates at a normal low speed, being connected through line 114.

Switch 112 is operated by a relay 115 which is actuated by a bridge control circuit 116 including an electrical sensing device comprising a pair of electrodes 117. As shown in FIGS. 8 and 14, the electrodes consist of two pieces of metal that are electrically insulated from one another, and disposed as a socket unit in the header plate. Each electrode is connected to one side of the electrical bridge circuit 116, and both are completely immersed in the frozen aerated mix.

The bridge circuit provides a source of current which is passed through the mix from one electrode to the other. The size and spacing of the electrodes, as well as the conductivity of the mix, will affect the amount of current that passes between electrodes. However, once the electrodes are installed, the variables of size and spacing become fixed, then the measured conductance is only dependent upon the aerated consistency or over-run of the mix.

The bridge control circuit 116 may be of standard construction, one satisfactory unit being the Type RE–18 Solu Bridge Controller manufactured by Industrial Instruments, Inc., 89 Commerce Road, Cedar Grove, New Jersey. It is an electronic device having a bridge loop of which the conductance across electrodes 117 becomes a part. A level of conductivity can be set on the instrument dial and whenever the flow of electricity across the electrodes is greater than the dial setting, the instrument will actuate relay 115 to operate switch 112 closed. When the conductivity is the same or less than the dial setting, the relay will be de-energized and switch 112 will open.

Accordingly, a desired aerated consistency or over-run may be selected in terms of conductance. If it is desired to produce a product with large amounts of air whipped into the mix, then the conductivity setting selected is relatively low. And as soon as the conductivity across the electrodes exceeds the setting, relay 115 will be actuated to close switch 112 and actuate relay 102, thereby connecting the high speed winding to increase the agitation. As additional quantities of air are whipped into the mix, the conductance thereof decreases; and when it drops to the level of conductance selected on the instrument, relay 115 is de-energized, switch 112 opens, relay 102 is deactivated and switch 111 closes to the low speed motor winding over line 114.

One complete cycle of operation for dispensing a measured quantity of frozen mix, taken with reference to FIGS. 2, 3 and 8–13, is as follows:

When it is desired to dispense a quantity of frozen mix, push button 106 is momentarily actuated to complete a circuit from the positive side of a power source along line 118, line 119, switch 96, line 120, and solenoid 105 to ground. Solenoid 105 actuates valve 92 connecting pneumatic pressure to cylinder 89 over conduit 93, FIG. 10, thereby moving rod 91 and rotating valve cylinder 75 open to container 1.

A second circuit is also completed from line 119 to line 121, line 122, and relay 98 to ground, thereby operating switches 99 and 100 closed. With the closing of switch 99, a circuit is completed for relay 102 along line 123. Actuation of relay 102 operates switch 111 to connect line 113 to place motor 6 into high speed. It will be noted that as rod 91 begins to move, switch 95 operates to its biased contact position, completing a holding circuit for relay 98 from line 118 to line 122. Therefore, the relay will remain active even though push button 106 is allowed to open. Also, as switch 95 operates into the biased position, the energizing circuit for solenoid 97 is broken, allowing valve 82 to close. Valve member 22 will then be moved by spring 34 against cap plate 24 as shown in FIG. 2, closing off opening 27 but opening cylinder 21 to a source of prepared mix.

When piston 91 arrives at the far end of its travel, collar 94 actuates tilt cam 104, allowing switch 96 to operate into its biased position, thereby energizing solenoid 101 over line 118, switch 95, line 121, line 24 and switch 100. Solenoid 101 actuates valve 83 and connecting pneumatic pressure to work cylinder 79, driving rod 108 upward to the position shown in FIG. 2, cylinder 75 taking in a quantity of aerated frozen mix. Simultaneously, plunger means 23 is operated to the position of FIG. 2, cylinder 21 taking in a quantity of prepared mix from the supply source.

As piston rod 108 completes its upward travel, collar 107 closes switch 109 and completes a circuit for solenoid 110 over line 118, line 121, switch 96, and line 125. Valve 92 is thereby actuated to its other position, connecting work cylinder 89 to pneumatic pressure source 81 through conduit 93a; piston rod 91 is moved back into its original starting position and collar 94 actuates switches 95 and 96, thereby de-energizing relay 98 while energizing solenoid 97. Valve 82 is then operated open, admitting pneumatic pressure into work cylinder 80 and conduit 25, thereby operating valve member 22 against spring 34 closing opening 26 and exposing opening 27 to allow fluid communication between cylinders 20 and 21. Almost simultaneously therewith, the plunger means 23 and 78 are operated into their respective cylinders, inserting and dispensing measured quantities of mix into and from container 1. Piston 108 moves downward, moving collar 107 away from switch 109 and de-energizing solenoid 110.

One cycle of operation has now been completed and each mechanical trip and electrical relay or solenoid is positioned in its initial position. Since the cycle of operation will not repeat until line 119 is energized, no further dispensing cycles will occur unless the push button 106 is held in the closed position.

If the aerated consistency of the mix has not yet been agitated to the proper selected consistency, the condition will be detected by the bridge control circuit 116. In such case, relay 115 will operate switch 112 to actuate relay 102 and maintain the high speed agitation until the proper consistency is developed. It will be noted that the control circuit 116 cooperates with a dispensing cycle but operates independently thereof. Accordingly, the speed of agitation is not wholly dependent upon a dispensing cycle of operation.

Figure 15:
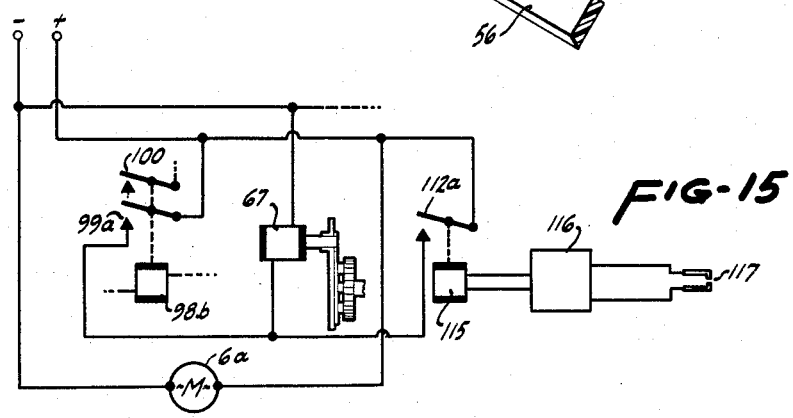
FIG. 15 is a schematic wiring diagram for an alternate dasher control circuit.

FIG. 15 illustrates a modified control circuit for increasing the speed of agitation in apparatus which employs the agitating structure of FIG. 7. The motor 6a has but a single winding for driving the dasher shaft 52 continually at one speed, and is connected directly across the power lines. Solenoid 67 replaces relay 102 and is, therefore, operated either upon the closure of switch 99a or 112a. The control circuit for dispensing and inserting quantities of mix and the control circuit for operating switch 112a are identical to the circuitry of FIG. 13.

Figure 16:
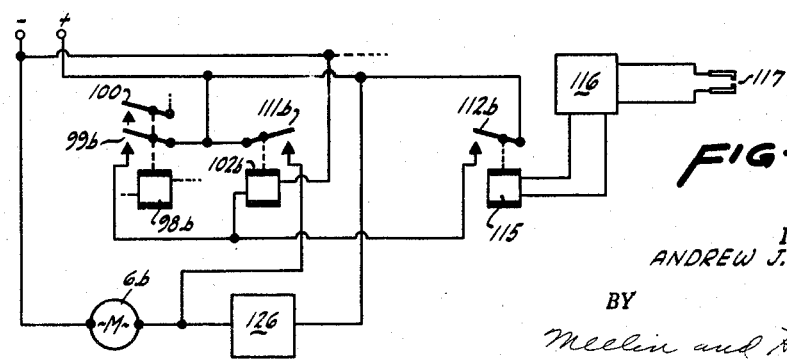
FIG. 16 is a wiring diagram for a third dasher control circuit.

Another agitating control circuit is illustrated in FIG. 16, whereby a single speed motor 6b is operated alternatively by one of two control circuits. Relay 102b operates a switch 111b closed upon actuation of either switch 99b or switch 112b, thereby connecting motor 6b to a source of power. However, the motor may also be operated through a parallel connecting circuit having a timer switch 126 which operates the motor after a certain time lapse following its last operation. Once the switch is closed, it will remain closed for one period of timed operation, then open, thus providing periodic motor operation. Timer switches of this kind are well known in the switch art, and may be thermal operated. Accordingly, with this arrangement of motor control circuitry, motor 6b is normally inactive but will be activated either by a dispensing operation, by the consistency detecting circuit 116, or by the mere lapse of time since its last operation.

It is to be understood that the forms of invention shown and described are to be taken as prefered examples thereof. Various substitutions of elements or changes in the shape, size and arrangement of parts may be made without departing from the spirit of the invention or the scope of the attached claims, and all such arrangements are contemplated.

Having thus described my invention, what I claim and desire to secure by Letters Patent is:

1. A machine for processing and dispensing ice cream products or the like comprising means defining a freezing chamber for containing a quantity of mix, means for dispensing a predetermined quantity of aerated frozen mix from said chamber, means for inserting a predetermined quantity of prepared mix into said chamber, means in said chamber for agitating said mix to a desired aerated consistency, a two-speed motor operatively connected to said agitating means, and a bridge circuit responsive to mix consistency for operating said motor at its higher speed whenever the mix consistency becomes subnormal to that desired, said bridge circuit including electrical sensing means disposed in said chamber means and exposed to circumambient mix.

2. A machine for processing and dispensing ice cream products or the like comprising means defining a freezing chamber for containing a quantity of mix, means for dispensing a predetermined quantity of aerated frozen mix from said chamber, means for inserting a predetermined quantity of prepared mix into said chamber, means in said chamber for agitating said mix to a desired consistency, a motor means having two speeds and operatively connected to said agitating means, a bridge circuit responsive to mix consistency for operating said motor at its higher speed whenever the mix consistency becomes subnormal to that desired, said bridge circuit including electrical sensing means disposed in said chamber means and exposed to circumambient mix, and a periodic circuit control means connected in parallel with said bridge circuit for activating said motor means intermittently.

3. A machine for processing and dispensing ice cream products or the like comprising means defining a freezing chamber for containing a quantity of mix, means for dispensing a predetermined quantity of aerated frozen mix from said chamber, means for inserting a predetermined quantity of prepared mix into said chamber, means in said chamber for agitating said mix to a desired consistency and including a dasher rotatably mounted in said chamber means on first and second axes, said second axis being radially spaced from said first axis, a bull gear rotatably mounted on said first axis, a pinion rotatably mounted on said second axis with said dasher and enmeshed with said bull gear; means for selectively dogging said bull gear to prevent its rotation, motor means for rotating said dasher about said first axis, a bridge circuit responsive to mix consistency for operating said dogging means whenever the mix consistency becomes subnormal to that desired, said bridge circuit including electrical sensing means disposed in said chamber means and exposed to circumambient mix.

4. In a machine for processing ice cream products or the like, and having means defining a freezing chamber, means in said chamber for agitating a quantity of mix with air to produce a desired aerated consistency, a two-speed motor operatively connected to said agitating means, a bridge circuit responsive to mix consistency for operating said motor at its higher speed whenever the mix consistency becomes subnormal to that desired, said bridge circuit including electrical sensing means disposed in said chamber means and exposed to circumambient mix.

5. In a machine for processing ice cream products or the like and having means defining a freezing chamber, means in said chamber for agitating a quantity of mix with air to produce a desired aerated consistency, a motor means having two speeds and operatively connected to said agitating means, a bridge circuit responsive to mix consistency for operating said motor at its higher speed whenever the mix consistency becomes subnormal to that desired, said bridge circuit including electrical sensing means disposed in said chamber means and exposed to circumambient mix, and a periodic control means connected in parallel with said bridge circuit for activating said motor means intermittently.

6. In a machine for processing ice cream products or the like and having means defining a freezing chamber, means in said chamber for agitating a quantity of mix with air to produce a desired aerated consistency and including a dasher rotatably mounted on first and second axes, said second axis being radially spaced from said first axis, a bull gear rotatably mounted on said first axis, a pinion rotatably mounted on said second axis with said dasher and enmeshed with said bull gear, means for selectively dogging said bull gear to prevent its rotation, a motor means for rotating said dasher about said first axis, and a bridge circuit responsive to mix consistency for operating said dogging means whenever the mix consistency becomes subnormal to that desired, said bridge circuit including electrical sensing means disposed in said chamber means and exposed to circumambient mix.

7. A machine for processing and dispensing ice cream products or the like comprising means defining a pressurized freezing chamber for containing a quantity of mix, means for dispensing a predetermined quantity of aerated frozen mix from said chamber, means for inserting a predetermined quantity of prepared mix into said chamber, means for injecting sufficient air into said chamber to establish a predetermined chamber pressure, means in said chamber for agitating said mix to a desired aerated consistency; a two-speed motor operatively connected to said agitating means, a pair of spaced electrodes disposed in said chamber means and exposed to circumambient mix, and a bridge circuit control means responsive to mix consistency at said electrodes for operating said motor at its higher speed whenever the mix consistency becomes subnormal to that desired.

8. A machine for processing and dispensing ice cream products or the like comprising means defining a pressurized freezing chamber for containing a quantity of mix, means for dispensing a predetermined quantity of aerated frozen mix from said chamber, means for inserting a predetermined quantity of prepared mix into said chamber, means for injecting sufficient air into said chamber to establish a predetermined chamber pressure, means in said chamber for agitating said mix to a desired consistency; a motor means operatively connected to said agitating means, a pair of spaced electrodes disposed in said chamber means and exposed to circumambient mix, a bridge circuit control means responsive to mix consistency at said electrodes for activating said motor means whenever the mix consistency becomes subnormal to that desired, and a periodic circuit control means connected in parallel with said bridge circuit control means for activating said motor means intermittently.

9. A machine for processing and dispensing ice cream products or the like comprising means defining a pressurized freezing chamber for containing a quantity of mix, means for dispensing a predetermined quantity of aerated frozen mix from said chamber, means for inserting a predetermined quantity of prepared mix into said chamber, means for injecting sufficient air into said chamber to establish a predetermined chamber pressure; means in said chamber for agitating said mix to a desired consistency and including a dasher rotatably mounted in said chamber means on first and second axes, said second axis being radially spaced from said first axis, a bull gear rotatably mounted on said first axis, a pinion rotatably mounted on said second axis with said dasher and enmeshed with said bull gear, means for selectively dogging said bull gear to prevent its rotation, motor means for rotating said dasher about said first axis; a pair of spaced electrodes disposed in said chamber means and exposed to circumambient mix, and a bridge circuit control means responsive to mix consistency at said electrodes for operating said dogging means whenever the mix consistency becomes subnormal to that desired.

10. In a machine for processing ice cream products or the like and having means defining a freezing chamber, means in said chamber for agitating a quantity of mix with air to produce a desired aerated consistency; a two-speed motor operatively connected to said agitating means, a pair of spaced electrodes disposed in said chamber means and exposed to circumambient mix, and a bridge circuit control means responsive to mix consistency at said electrodes for operating said motor at its higher speed whenever the mix consistency becomes subnormal to that desired.

11. In a machine for processing ice cream products or the like and having means defining a freezing chamber, means in said chamber for agitating a quantity of mix with air to produce a desired aerated consistency; a motor means operatively connected to said agitating means, a pair of spaced electrodes disposed in said chamber means and exposed to circumambient mix, a bridge circuit control means responsive to mix consistency at said electrodes for activating said motor means whenever the mix consistency becomes subnormal to that desired; and a periodic circuit control means connected in parallel with said bridge circuit control means for activating said motor means intermittently.

12. In a machine for processing ice cream products or the like and having means defining a freezing chamber, means in said chamber for agitating a quantity of mix with air to produce a desired aerated consistency and including a dasher rotatably mounted on first and second axes, said second axis being radially spaced from said first axis, a bull gear rotatably mounted on said first axis, a pinion rotatably mounted on said second axis with said dasher and enmeshed with said bull gear, means for selectively dogging said bull gear to prevent its rotation; a motor means for rotating said dasher about said first axis, a pair of spaced electrodes disposed in said chamber means and exposed to circumambient mix, and a bridge circuit control means responsive to mix consistency at said electrodes for operating said dogging means whenever the mix consistency becomes subnormal to that desired.

13. In a machine for processing ice cream products or the like and having a means defining a freezing chamber, means in said chamber for agitating a quantity of mix with air to produce a desired consistency and including a dasher assembly rotatably mounted on a first axis; said assembly comprising a motor driven shaft, support yokes mounted on said shaft at axially spaced distances, each yoke having radiating spider members angularly spaced and substantially parallel to the radiating spider members of the other yokes, a first scraper blade torsionally mounted between first parallel spider members being rigidly secured at one end and rotatably supported at the other end, a second scraper blade torsionally mounted between second parallel spider members being rigidly secured at one end and rotatably supported at the other end, said first and second scraper blades complementing each other to scrape adjacent axial areas of said freezing chamber, and a helical pusher blade mounted between certain axially spaced spider members to urge said mix toward a discharge end.

14. In a machine for processing and dispensing ice cream products or the like including a processing container for a mix; a dispensing means including a first measuring chamber, a first two-way valve member connecting said measuring chamber alternatively to said container or to the atmosphere, first plunger means reciprocally movable in said first measuring chamber; a mix inserting means including a second measuring chamber, a second two-way valve member connecting said second measuring chamber alternatively to said container or to a source of mix, second plunger means reciprocally movable in said second measuring chamber; and means for simultaneously actuating said first and second plunger means.

15. In a machine for processing and dispensing ice cream products or the like including a processing container for a mix; a dispensing means including a first measuring chamber, a first two-way valve member connecting said measuring chamber alternatively to said container or to the atmosphere, first plunger means reciprocally movable in said first measuring chamber; a mix inserting means including a second measuring chamber, a second two-way valve member connecting said second measuring chamber alternatively to said container or to a source of mix, second plunger means reciprocally movable in said second measuring chamber; a first double acting work cylinder having a piston connecting with said first plunger means, a second double acting work cylinder having a piston connecting with said second plunger means, said first and second cylinders being fluidly interconnected at one end, a source of operating pressure, and valve means for selectively connecting the other end of either work cylinder to said pressure source.

16. In a machine for processing and dispensing ice cream products or the like including a processing container for a mix; a dispensing means including a first measuring chamber, a first two-way valve member connecting said measuring chamber alternatively to said container or to the atmosphere, first plunger means reciprocally movable in said first measuring chamber; a mix inserting means including a second measuring chamber, a second two-way valve member connecting said second measuring chamber alternatively to said container or to a source of mix, second plunger means reciprocally movable in said second measuring chamber; means interconnecting said first and second plunger means and providing simultaneous actuation thereof, and means for adjusting the relative amount of travel of said first and second plunger means, thereby enabling various volume proportions of mix to be simultaneously dispensed from and inserted into said processing container.

17. In a machine for processing and dispensing ice cream products or the like including a processing container for a mix; a dispensing means including a first measuring chamber, a first two-way valve member connecting said measuring chamber alternatively to said container or to the atmosphere, first plunger means reciprocally movable in said first measuring chamber; a mix inserting means including a second measuring chamber, a second two-way valve member connecting said second measuring chamber alternatively to said container or to a source of mix, second plunger means reciprocally movable in said second measuring chamber; a first double acting work cylinder having a piston connecting with said first plunger means, a second double acting work cylinder having a piston connecting with said second plunger means, said first and second cylinders being fluidly interconnected at one end, a source of operating pressure, valve means for selectively connecting the other end of either work cylinder to said pressure source, and means for adjusting the relative amount of travel of said first and second plunger means, thereby enabling various volume proportions of mix to be simultaneously dispensed from and inserted into said processing container.

18. In a machine for producing and dispensing ice cream products or the like including a processing container for a mix; a dispensing means including a first measuring chamber, a first two-way valve member connecting said measuring chamber alternatively to said container or to the atmosphere, first plunger means reciprocally movable in said first measuring chamber; a mix inserting means including a second measuring chamber, a second two-way valve member connecting said second measuring chamber alternatively to said container or to a source of mix, second plunger means reciprocally movable in said second measuring chamber; first means for simultaneously actuating said first and second plunger means, second means for actuating said first two-way valve, third means for actuating said second two-way valve, and control circuit means for operating each of said actuating means through a single cycle of operation; whereby said first two-way valve will open to said container, said second two-way valve will open to said source of mix, said first and second plunger means will be actuated to fill said chambers, said first two-way valve will open to said atmosphere, said second two-way valve will open to said container and said first and second plunger means will be actuated to respectively discharge into said atmosphere and said container.

19. In a machine for processing ice cream products or the like including a container means having an inner circular cylindrical surface, a scraper blade support means rotatably mounted within said container means upon the axis of said cylindrical surface, and a resilient scraper blade torsionally mounted upon said support means and in contact with said surface, said blade being rigidly mounted to said support means at one portion of its length and rotatably supported at another portion of its length.

20. In a machine for processing ice cream products or the like including a container means having an inner circular cylindrical surface, a scraper blade support means rotatably mounted within said container means upon the axis of said cylindrical surface, said support means having axial spaced support members, and a resilient scraper blade torsionally mounted between said support members and in contact with said surface, said blade having one end fixed to one support member and the other end rotatably mounted in another support member.

References Cited in the file of this patent

UNITED STATES PATENTS

| | | |
|---|---|---|
| 1,783,867 | Vogt | Dec. 2, 1930 |
| 1,957,707 | Glauser | May 8, 1934 |
| 2,013,018 | Vogt | Sept. 3, 1935 |
| 2,266,766 | Knight | Dec. 23, 1941 |
| 2,523,853 | Woodruff | Sept. 26, 1950 |
| 2,527,894 | Tacchella | Oct. 31, 1950 |
| 2,557,813 | Burton | June 19, 1951 |
| 2,565,121 | Clardy | Aug. 21, 1951 |
| 2,594,442 | Irwin | Apr. 29, 1952 |
| 2,619,117 | Stranak | Nov. 25, 1952 |
| 2,651,439 | Stevenson | Sept. 8, 1953 |
| 2,713,253 | Chandler | July 19, 1955 |
| 2,734,667 | Conklin | Feb. 14, 1956 |
| 2,760,344 | Oltz | Aug. 28, 1956 |